Nov. 30, 1937. E. G. STAUDE Re. 20,565

COMBINED CLUTCH AND BRAKE CONTROL

Original Filed March 1, 1916 6 Sheets-Sheet 1

WITNESSES
M. R. McLennis
E. A. Paul

INVENTOR
EDWIN G. STAUDE
BY Paul & Paul
ATTORNEYS

Nov. 30, 1937. E. G. STAUDE Re. 20,565

COMBINED CLUTCH AND BRAKE CONTROL

Original Filed March 1, 1916 6 Sheets-Sheet 2

WITNESSES
M. P. McInnis
E. A. Paul

INVENTOR
EDWIN G. STAUDE
BY Paul & Paul
ATTORNEYS

Nov. 30, 1937. E. G. STAUDE Re. 20,565

COMBINED CLUTCH AND BRAKE CONTROL

Original Filed March 1, 1916 6 Sheets-Sheet 3

WITNESSES
M. R. M
E. A. Paul

INVENTOR
EDWIN G. STAUDE
BY Paul & Paul
ATTORNEYS

Nov. 30, 1937. E. G. STAUDE Re. 20,565

COMBINED CLUTCH AND BRAKE CONTROL

Original Filed March 1, 1916 6 Sheets-Sheet 4

WITNESSES
M. R. McInnis
E. A. Paul

INVENTOR
EDWIN G. STAUDE
BY Paul & Paul
ATTORNEYS

Nov. 30, 1937. E. G. STAUDE Re. 20,565

COMBINED CLUTCH AND BRAKE CONTROL

Original Filed March 1, 1916 6 Sheets-Sheet 5

WITNESSES

M. R. M. Lennig

E. A. Paul

INVENTOR

EDWIN G. STAUDE

BY Paul & Paul

ATTORNEYS

COMBINED CLUTCH AND BRAKE CONTROL

Original Filed March 1, 1916 6 Sheets-Sheet 6

Z.-Z.

Y-Y.

X-X.

WITNESSES
M. R. McInnis
E. A. Paul

INVENTOR
EDWIN G. STAUDE
BY Paul & Paul
ATTORNEYS

Reissued Nov. 30, 1937

Re. 20,565

UNITED STATES PATENT OFFICE 20,565

COMBINED CLUTCH AND BRAKE CONTROL

Edwin G. Staude, Minneapolis, Minn.

Original No. 1,447,908, dated March 6, 1923, Serial No. 81,468, March 1, 1916. Renewed February 27, 1919, Serial No. 279,600. Application for reissue November 23, 1934, Serial No. 754,523

26 Claims. (Cl. 192—.01)

In the operation of a power propelled vehicle, it is customary to provide a clutch and a brake pedal, depression of one releasing the clutch and of the other setting the brake.

The object of my invention is to provide a single pedal for operating both the clutch and the brake, instantly or gradually, as may be desired.

A further object is to provide a pedal which, when set in a certain predetermined position, will control both the clutch and brake, and permit independent operation of the engine accelerator.

Other objects of the invention will appear from the following detailed description.

The invention consists generally in various constructions and combinations, all as hereinafter described and particularly pointed out in the claims.

In the accompanying drawings forming part of this specification:

Figure 6:
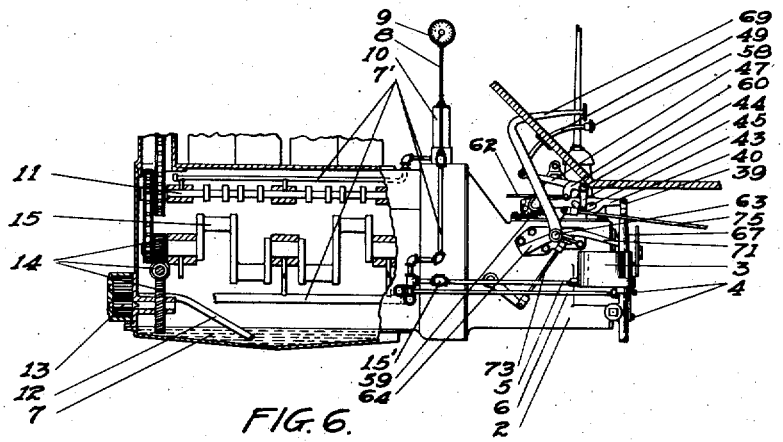
Figure 6 is a general view, partially in section, the wall of the gear case being broken away to illustrate the oil circulating system therein.
Figure 9:
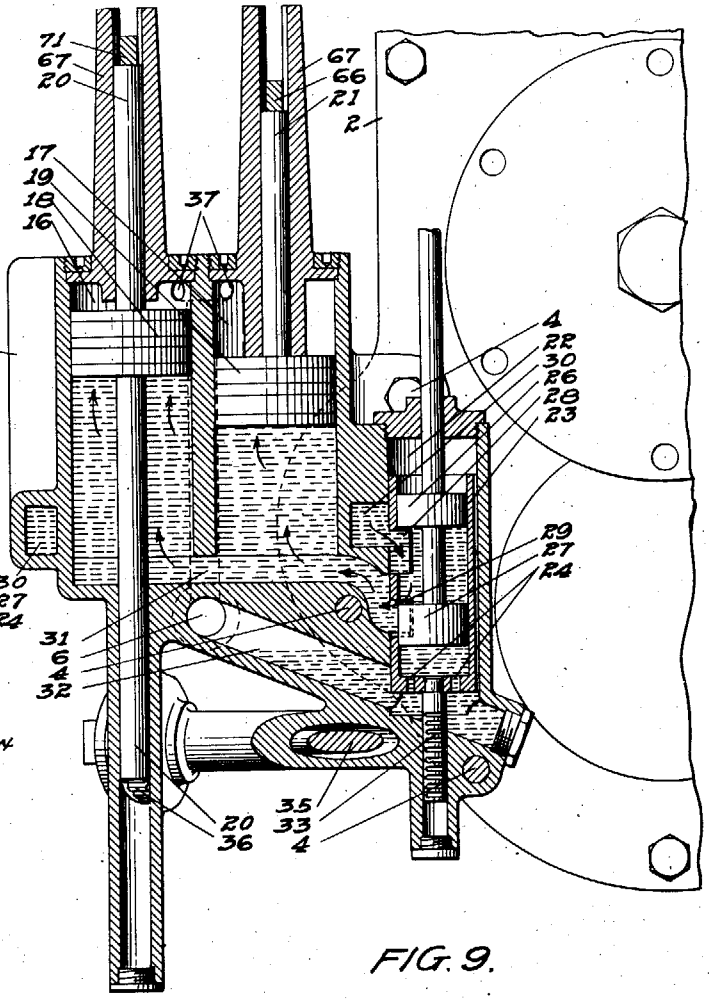
Figures 8 and 9 are vertical sectional views, through the attachment that is mounted on the wall of the gear case and illustrating two positions of the controlling valve in the circulating system.

In the drawings, 2 represents the gear case of a gas engine of any ordinary or preferred construction. To this gear case a casing 3 is secured by suitable means, preferably by inserting the bolts 4 in the head of the gear case through holes provided in the casing, as indicated in Figure 9. This allows the casing to be mounted on the gear case or removed conveniently, whenever desired, without disturbing the other parts of the engine. Supply and return pipes 5 and 6 communicate with the crank case 7 and with the oil circulating system 7', having a tube connection 8 with a gauge 9 and a valve 10 mounted to open under pressure of the oil for lubricating the bearings of the cam shaft 11. The valve 10 also acts as a relief valve when the pressure in the system becomes excessive. A suction pipe 12 has its open end in the well in the bottom of the crank case and leads to the gear pump 13 that is driven through the gear 14 from the crank shaft 15 (see Figures 1, 6 and 7). This crank case and oil circulating system is in general use in this type of engine.

Figure 7:
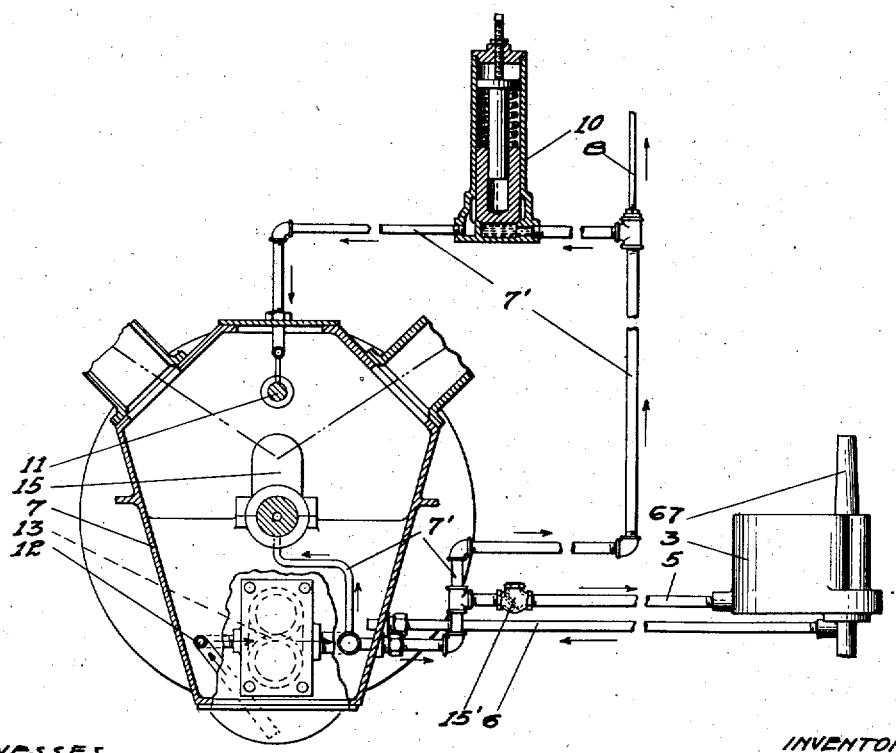
Figure 7 is a sectional view, showing the application of the clutch and brake control mechanism to the oil circulating system.

The supply pipe 5 has a check valve 15' therein mounted to open with the oil pressure to admit the oil to the pipe 5 and the casing 3 and prevent its return flow through this pipe. The return pipe 6 leads back into the bottom of the crank case, as shown in Figure 7. This check valve 15' also acts under conditions below described to hold pressure in the system when the pump is not operating. The casing 3 is provided with cylinders 16 and 17, having pistons 18 and 19 therein provided with stems 20 and 21. The casing also has a valve chamber 22 preferably provided with a sleeve 23 open at one end and closed at its opposite end except for ports 24 therein. A valve stem 25 has heads 26 and 27 thereon within said sleeve, said heads being spaced apart a suitable distance for bridging ports 28 and 29 in the walls of said sleeve, and acting as pressure balancing means for said valve. The supply pipe 5 communicates with an intake port 30 in the wall of said valve chamber and this port is arranged to register with the port 28 in the sleeve to admit the inelastic fluid between the valve heads and the port 29 when said sleeve is arranged to register at a point in its movement with a passage 31 which extends across the cylinders 16 and 17 and communicates therewith.

Figure 10:
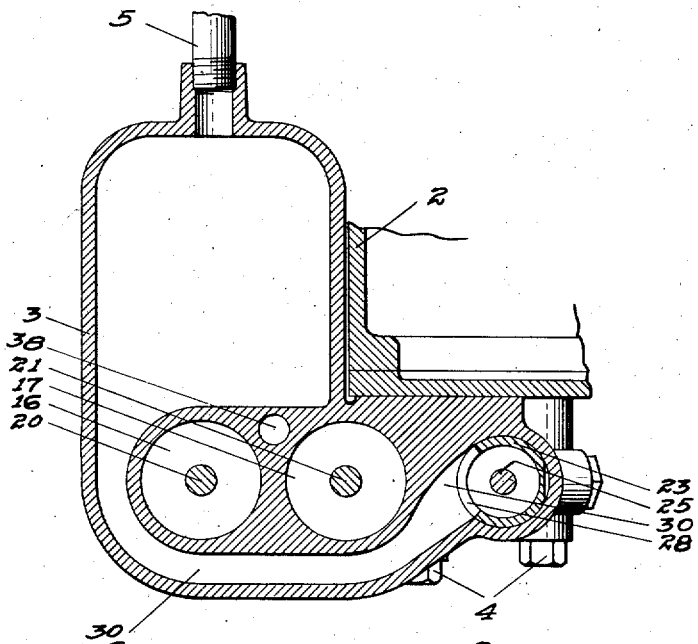
Figure 10 is a sectional view on the line $z$—$z$ of Figure 8.
Figure 11:
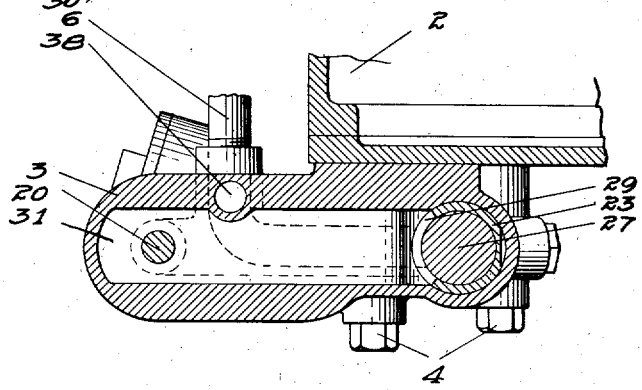
Figure 11 is a sectional view on the line $y$—$y$ of Figure 8.

A chamber 32 is provided in the lower walls of the casing 3 and communicates with the return pipe 6 and also with the interior of the sleeve 23 through the ports 24. The enlarged portion shown in Figure 10 connected with the supply pipe 5 and leading to the intake port 30 acts as a storage chamber for the fluid under pressure and thus provides an instant demand capacity considerably in excess of the pump capacity when required by the degree of movement or opening of the controlling valve 27. The upper end of the casing 3 has a chamber therein forming an air cushion for the inelastic fluid, the lower portion of this chamber being shown in section in Figure 10. The intake port 29 leads into an operating chamber having therein any suitable means such as the pistons 18—19 against which fluid pressure, generated by the pump or by the air cushion, acts to control a part of the automobile. Valve 10 acts also to limit the amount of pressure applied against the air cushion, because if the pressure in the system becomes excessive, the valve is opened, as has been before mentioned. The valve 15' is shown so placed as to prevent back flow toward the pump when the latter is inoperative, and thus this valve also assists in the effectiveness of control by means of cushion-stored power, acting independently of the pump.

It will be again noted that when the pump is operating, the inelastic fluid compresses the air in the upper part of the casing 3 and sufficient power is thus stored for properly operating the pistons or other suitable means, independently of any pressure furnished by the pump. Moreover, while the pump is operating, power is being stored as a result of compression of the air, or its functionally equivalent means. This air cushion constitutes elastic means compressible by the inelastic fluid, and adapted after compression to react with sufficient force to maintain the pressure-applying condition of the inelastic fluid when the pump is inoperative. Thus, an accumulator reservoir for braking power or clutch operation, or other purposes, is provided. The air is put under compression and thereafter reacts with sufficient force to operate either piston or both pistons, independently of the pump.

Figure 12:
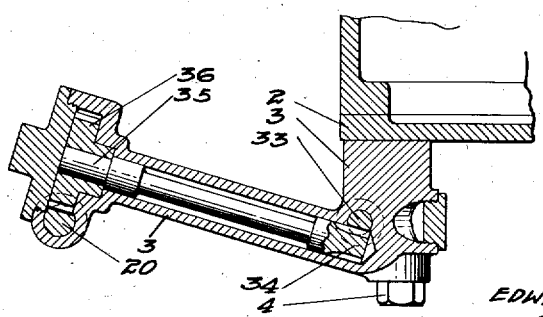
Figure 12 is a sectional view on the line $x$—$x$ of Figure 8.

A rack 33 is mounted on the lower end of the sleeve 23 and is vertically slidable therewith and engages the teeth of a pinion 34 (see Figure 12) on a shaft 35 having a gear 36 which meshes with a rack provided on the lower end of the rod 20 of the piston 18 and thereby simultaneous movement in opposite directions of the piston 18 and the sleeve 23 is effected. Ports 37 are preferably provided in the upper walls of the cylinders 16 and 17 communicating with a passage 38 which leads downwardly to the return pipe to allow the escape of any oil which may work by the pistons during their operation in the cylinders.

The sleeve 23 has the function of a cut-off. When the brake piston 18 is raised from the position shown in Figure 8 to that shown in Figure 9, the sleeve is drawn down to partially close the passage to the pistons and thereby to regulate the flow of the inelastic fluid thereto. The valve within the sleeve is controlled by the foot of the driver, while the sleeve is operated by the movement of the brake piston and evidently if the valve is moved slowly, the ports in the sleeve will be exposed slowly and the brake piston will be moved gradually to apply the brake. Should the driver desire to apply the brake quickly, a rapid movement of the valve will temporarily expose a larger opening and permit the entrance of a greater volume of inelastic fluid to the brake piston cylinder to effect a rapid movement of this piston and a corresponding application of the brake. In this way, the driver of the car has complete control of the brake and clutch and through the manipulation of the pedal by the foot can stop the car instantly or gradually as conditions may require.

The upper end of the valve stem 25 (see Figure 1) is pivotally connected at 39 to a lever 40 which is pivoted at 41 to a bracket 42. This lever has a cam slot 43 formed therein. A bell crank is pivoted at 44 and has a short arm 45 provided with an anti-friction roller 46 which is fitted into a cam slot 43 and positioned to bear on the edges thereof. The long arm 47 of the bell crank projects upwardly under the foot board 48 and at its upper end has a pivotal connection with a pedal arm 49, said connection comprising preferably a stud 50 on the arm 47 fitting within a socket 51 in the pedal arm and held therein by a pin 52 provided with a head 53 and a compression spring 54. The pedal arm projects through a slot 55 in the foot board and is provided with a lug 56 to engage the edge of a plate 57 that is secured to the underside of the foot-board in register with the slot 55. The upper end of the rod 49 has a pedal 58 of ordinary construction mounted thereon. An extension spring 59 is attached to the short arm 45 of the bell crank and to the gear casing and resists downward movement of the long arm 47 and the pedal arm. An arm 60 is mounted on the pivot 44 concentric with the bell crank and is provided with a shoulder 61 in position to be engaged by the long arm 47 when it is depressed beyond a certain predetermined point or below the position indicated in Figure 2, where the lug 56 is in engagement with the plate 57. A rod 62 connects the arm 60 with the accelerator to the engine (not shown). When, therefore, the pedal arm is depressed below the point shown in Figure 2, the accelerator will be operated in the usual manner.

Figure 8:
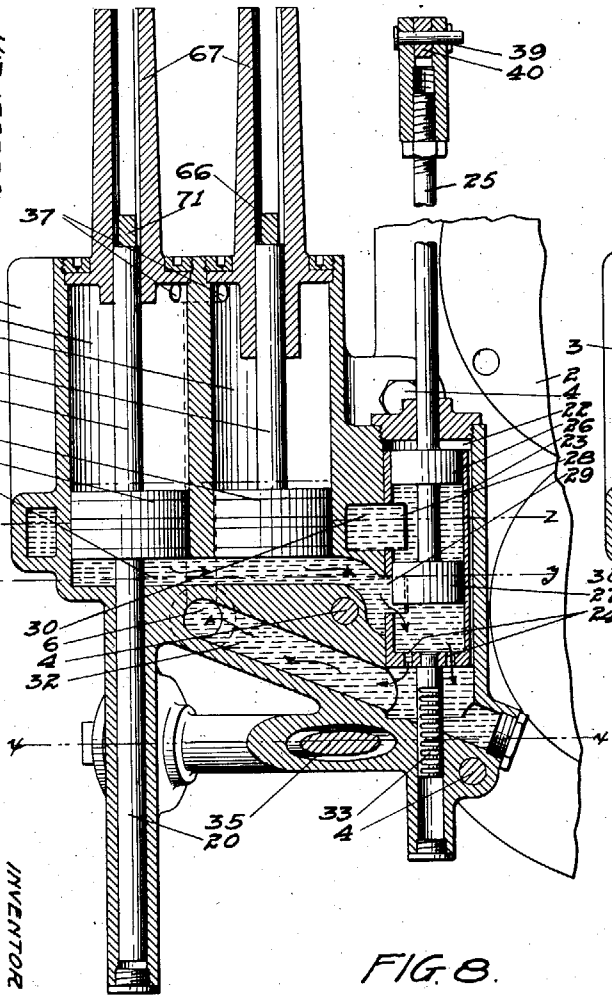

The initial downward movement of the arm 45 engaging the anti-friction roller 46 with the upper edge of the slot 43 will raise the lever 40 and set the valve heads 26 and 27 in the position shown in Figure 8. Further movement of the anti-friction roller will not affect the position of the lever 40 and the bell crank may be oscillated back and forth to actuate the accelerator without changing the position of the lever 40 or the valve heads. The accelerator may thus be used in the ordinary way during the driving of the car without the movement of the pedal affecting the clutch and brake control attachment.

A shaft 63 is mounted on a bracket 64 on the crank case and a hub 65 is secured on said shaft and has an arm 66 which bears on the upper end of the piston rod 21 and is vertically movable in guides 67. A hub 68 is secured on the end of the shaft 63 and has a pedal arm 69 for rocking the shaft in its bearing and oscillating the arm 66. A hub 70 is loosely mounted on said shaft and has an arm 71 mounted to bear on the piston rod 20 and vertically movable in guides corresponding to those of the arm 66. A pedal arm 72 is mounted on said hub 70 and both the arms 69 and 72 project upwardly through slots in the foot-board 48 in position to be operated by the foot of the driver. The hub 65 is connected with the clutch rod 73 and pedal arm 72 is pivotally connected at 74 to the brake rod 75, both the clutch and the brake being of ordinary construction and requiring no detailed illustration herein.

Figure 1:
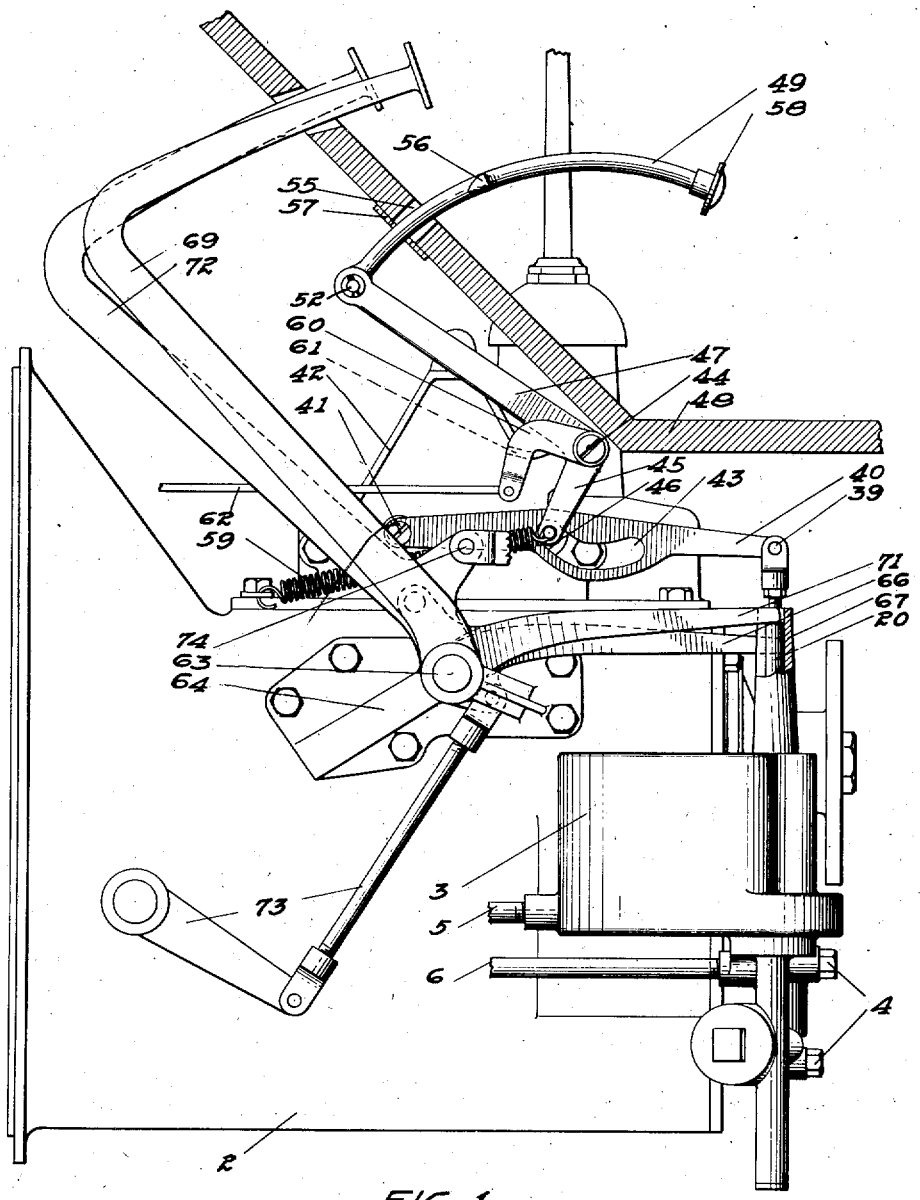
Figure 1 is a view, partially in section, of a gas engine gear case and the foot board of a car, showing my invention applied thereto.
Figure 2:
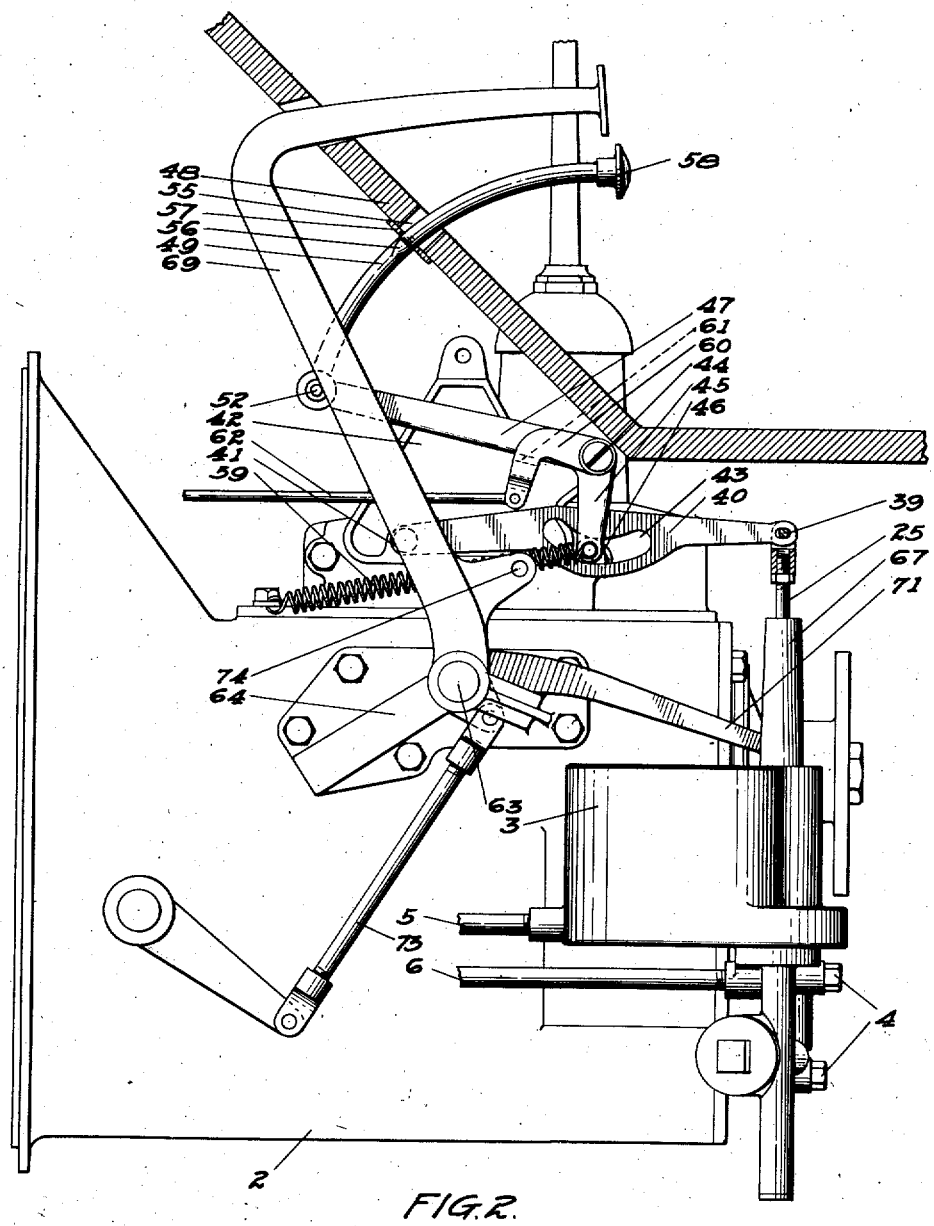
Figure 2 is a similar view, showing the pedal set in position for controlling the clutch and brake and operating the accelerator.
Figure 3:
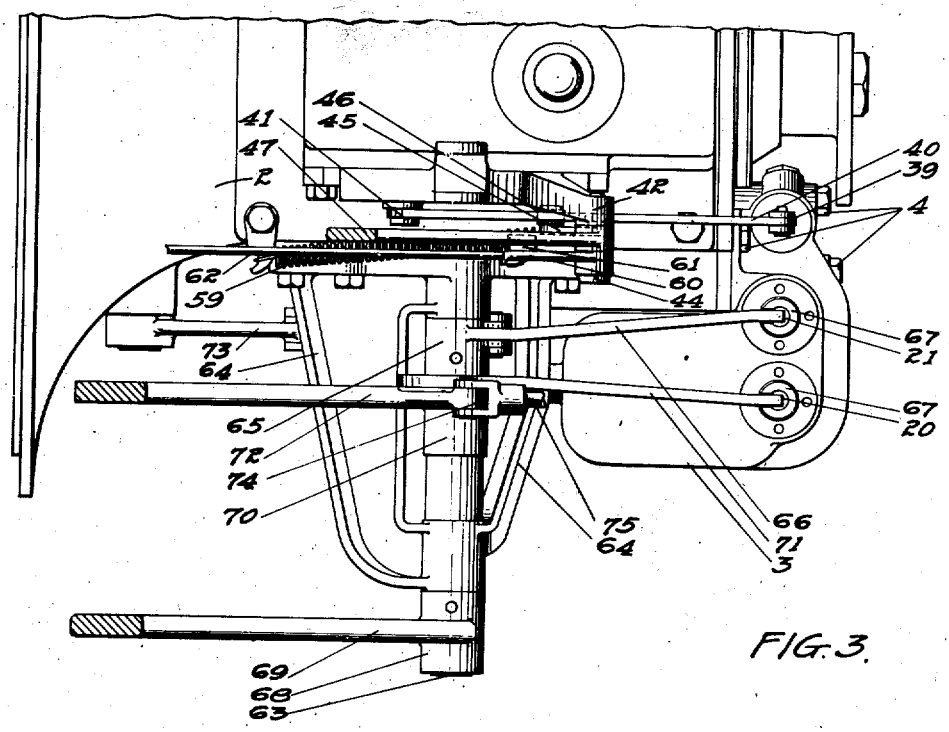
Figure 3 is a plan section, showing the relative position of the pedals and the operating mechanism connected therewith.
Figure 4:
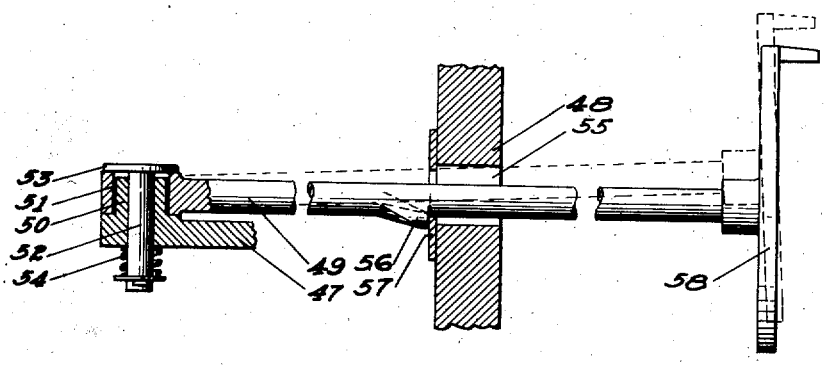
Figure 4 is a detail sectional view of the single pedal, showing the means for locking it in its partially depressed position.
Figure 5:
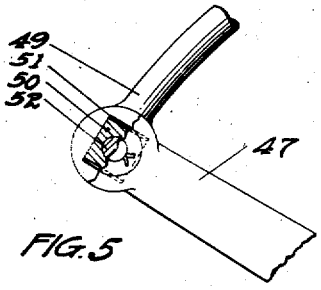
Figure 5 is a detail view of the joint in the pedal arm.

To use the device, the driver of the car will depress the pedal arm from the position shown in Figure 1 to that of Figure 2, thereby rocking the bell crank downwardly against the tension of the spring 59 and moving the anti-friction roller 46 in the cam slot 43 and raising the lever 40 through the engagement of the roller 46 with the upper edge of said slot. A slight movement of the pedal arm to one side will engage the lug 56 with the plate 57 and lock the arm in its depressed position. The valve connected with the lever 40 will be raised to the position indicated in Figure 8, the head 27 closing the passage between the port 30 and the passage 31 and thereupon the flow of the inelastic fluid from the port 30 into the passage 31 and the cylinders 16 and 17 will be cut off. The passage 31 will now be connected with the passage 32 through the port 29 in the side of the sleeve 23, and the ports 24 in the bottom of said sleeve, and the oil or inelastic liquid will be forced out of the cylinders 16 and 17 by the usual spring pressure ordinarily employed to connect the clutch and to release the brake. Such springs being in common use for this purpose are not illustrated herein. The oil will now exhaust from the cylinders 16 and 17, the passage 31, and the return pipe 6 into the crank case 7. The pedal arm will be in position to operate the accelerator when depressed beyond a point shown in Figure 2, as the continued movement of the anti-friction roller in the slot 43 will have no effect on the lever 40, the roller traveling in the arc of a circle having the same radius as the slot and consequently the arm 45 may move back and forth in the right hand end of the slot 43 without moving the lever 40 in either direction. This allows the driver of the car to control the accelerator without changing the position of the clutch or brake controlling valve. In case, however, it is desired to release the clutch and set the brake, the driver will disengage the pedal arm from the plate 57, whereupon the spring 59 will throw the bell crank upwardly and the arm 45, swinging toward the left, will engage the anti-friction roller 46 with the lower edge of the slot 43 and force the lever 40 downwardly, shifting the valve from the position shown in Figure 8 to that of Figure 9. The passage 31 will then be opened to the flow of oil from the port 30 and driven by the pump pressure the oil will enter the cylinders 16 and 17, raising the pistons 18 and 19 from the position shown in Figure 8 to that of Figure 9, one piston automatically, through its connections, releasing the clutch and the other setting the brake.

*Operation*

The lubricating system is operated in the usual manner, oil being forced through the pipe 7' by the pump. A portion of this oil will be forced through the valve 15' into the pipe 5 and the casing 3 and port 30 into the valve chamber 22. When the valve heads 26 and 27 are in the position shown in Figure 8, which is the position they will be in when the pedal arm is depressed, the further movement of the oil or inelastic fluid is checked and the pistons remain in the position shown in Figure 8 with the clutch connected and the brake released. When the pedal arm is released and returned to its normal position the valve stem 25 and the valve heads 26 and 27 move downward into the position shown in Figure 9. The oil or inelastic fluid now passes from the port 30, through the valve chamber, and into the passage 31 forcing the cylinders 18 and 19 upward into the position shown in Figure 9, and thereby disconnecting the clutch and setting the brake.

When the pistons 18 and 19 begin their upward travel the movement of the brake controlling piston 18, through the means described, moves the sleeve 23 downward from the position shown in Figure 8 to the position shown in Figure 9, thereby gradually closing the port leading into the passage 31 that communicates with the cylinders 16 and 17.

During the above described operation, the sleeve 23 will be shifted from the open position shown in Figure 8 to the position illustrated in Figure 9, where it operates as a cut-off to control the flow of the inelastic fluid to the pistons and enable the driver, as heretofore described, to check the speed of the car quickly or gradually, the application of the brake being governed entirely by the relative position of the controlling valve or cut-off sleeve.

It will be noted that this attachment is made as an adjunct or branch of the circulating system of the gas engine in which there is a constant pressure of the inelastic fluid when the engine is in operation, the controlling valve operating to admit this fluid pressure to the clutch and brake operating means or close the passage thereto, the cut-off in connection with the valve enabling the driver to still further control this flow through the travel of the brake operating means.

I have used the word "clutch" in the specification and claims in a broad or general sense, to indicate any suitable means for transmitting power from the engine to the driving axle of the vehicle, the specific form of such transmitting or connecting means forming no part of my invention.

It will be further noted that by the use of the compressible elastic means, a constant pressure of the inelastic fluid is always maintained when the engine is not in operation, or when the pump is not in operation, because during the operation of the pump, power has been stored in the accumulator chamber. Of course, in this case, the pedal-operated controlling valve operates to admit this fluid pressure to the clutch or brake operating means as in the first case. The important feature is that fluid pressure is assured during inoperative periods of the pump, as when the automobile is not running under power, or not running at all. Under these conditions, the check valve 15' acts of course to maintain the stored pressure. During operation of the pump the valve 10 relieves over-pressure in the system.

I claim as my invention:

1. A brake control for power propelled vehicles comprising a pedal, an accelerator rod actuated thereby, a fluid circulating system, a brake operating means therein, a valve controlling the flow of fluid through said system, the initial movement of said pedal operating said valve to cut off the flow of fluid through said system, the release of said pedal allowing the movement of said valve to open the passage through said system and actuate said brake-operating means.

2. A brake control for power propelled vehicles comprising a pedal, a fluid circulating system and brake operating means therein, a valve operated by the movement of said pedal for controlling the flow of fluid through said system, a cut-off telescoping with said valve and actuated through the movement of said brake operating means, the degree of movement of said valve controlling the flow of fluid in the system and the operation of the cut-off and the brake-operating means.

3. The combination, with the lubricating system of a gas engine for a power propelled vehicle, of cylinders and pistons therefor having pipe connections with said system and a valve for controlling the flow of fluid to said cylinders, means actuated through the movement of said pistons for releasing the clutch and setting the brake of the vehicle, a pedal arm having means for connection with said valve, movement of said arm operating said valve to cut off the flow of fluid to said pistons, the return movement of said arm operating said valve to release the fluid in said system.

4. A combined clutch and brake control for power propelled vehicles comprising a pedal arm, a fluid circulating system and means therein for operating the clutch and brake, a valve for controlling the flow of fluid through said system, a lever connected with said valve, means operating said lever during a predetermined part of the stroke of said pedal arm, said arm having means for operating the accelerator during the remainder of its stroke independently of said lever and valve, the initial movement of said arm setting said valve to close the flow of fluid through said system, connect the clutch and release the brake, the return of said arm to its normal position releasing said valve and admitting fluid pressure to said brake and clutch operating means to release the clutch and set the brake.

5. In a power propelled vehicle, a pedal arm having means for yieldingly holding it in its raised position, and means for locking it in its partially depressed position, a fluid circulating system, a clutch and brake operating means mounted therein, a valve for controlling the flow of fluid through said system and operatively connected with said pedal arm and actuated during its initial movement to check the flow of fluid in said system, and thereby connect the clutch and release the brake, the latter part of the stroke of said arm operating the accelerator independently of said valve, said arm, when released from its intermediate locking position, operating said valve to open said system to the flow of fluid therein for releasing said clutch and setting said brake.

6. The combination, with the lubricating system of a gas engine for a power propelled vehicle, of cylinders and pistons therefor having pipe connections with said lubricating system and a valve for controlling the flow of fluid to said cylinders, means actuated through the movement of said pistons for operating the clutch and the brake of the vehicle, a pedal arm having means for connection with said valve, the initial downward movement of said arm operating said valve to cut off the flow of fluid to said pistons thereby connecting the clutch and releasing the brake, the subsequent downward movement of said arm operating the accelerator independently of said valve, said arm, upon its return to its normal position, operating said valve to release the fluid in said system for reversely operating said clutch and brake pistons.

7. The combination, with a gas engine and its lubricating system having an inelastic fluid therein under constant pressure, of clutch and brake operating means in said system, a valve for controlling the flow of fluid to said clutch and brake operating means, a cut off connected for simultaneous movement with said brake operating means, and means for shifting said valve, the degree of movement of said valve regulating the volume of flow of the fluid and the travel of said brake operating means.

8. The combination with a gas engine and its lubricating system having an inelastic fluid therein under constant pressure, of a brake operating means in said system, a valve for controlling the flow of fluid to said brake operating means, a cut-off connected for simultaneous movement to said brake operating means, and means for shifting said valve to regulate the flow of fluid through said system, the degree of movement of said valve increasing or decreasing the volume of flow of the fluid and the travel of said brake operating means.

9. The combination with a gas engine and its lubricating system having an inelastic fluid therein under pressure. of brake operating means in said system, a valve for controlling the flow of fluid to said brake operating means, and means for shifting said valve, the degree of movement of said valve regulating the volume of flow of the fluid and the movement of the brake operating means.

10. The combination with a gas engine and its lubricating system having an inelastic fluid therein under pressure, of brake operating means in said system, a valve for controlling the flow of fluid to said brake operating means, a cut-off connected for simultaneous movement with said brake operating means, and means for shifting said valve, the degree of movement of said valve regulating the volume of flow of the fluid, the travel of said brake operating means, and the movement of said cut-off.

11. A brake control for power propelled vehicles, comprising a pedal arm, an inelastic fluid circulating system under pressure, brake operating means in said system, a valve for controlling the flow of fluid to said brake operating means and means for shifting said valve, the degree of movement of said valve regulating the volume of flow of the fluid, and the travel of said brake operating means, and elastic means compressible by the fluid and adapted after compression to re-act to maintain pressure-applying condition of the said fluid.

12. A brake control for power propelled vehicles, comprising a pedal arm, an inelastic fluid circulating system under pressure, brake operating means in said system, a valve connected with the pedal arm for controlling the flow of fluid to said brake operating means, the degree of movement of said valve regulating the volume of flow of the fluid, and the travel of said brake operating means, and elastic means compressible by the fluid and adapted after compression to re-act to maintain power-applying condition of the said fluid.

13. A brake control for power propelled vehicles, comprising a pedal arm, an inelastic fluid circulating system under pressure, brake operating means in said system, a cut-off valve connected for simultaneous movement with said brake-operating means, and means for shifting said valve, the degree of movement of said valve regulating the volume of flow of the fluid, and the travel of said brake operating means, and elastic means compressible by the fluid and adapted after compression to re-act to maintain power-applying condition of the said fluid.

14. In combination with an automobile, an inelastic fluid pressure system, means for creating pressure in the system, said system including an operating chamber having means therein against which the fluid acts to control a braking element of the automobile, said system also having elastic means compressible by the inelastic fluid during operation of the pressure-creating means and adapted to re-act to maintain the working pressure of said fluid when the pressure-creating means is inoperative, and a valve operable to control pressure flow of fluid to said operating chamber and means therein.

15. A control for power propelled vehicles comprising an inelastic fluid pressure system and means for creating pressure in the system, said system including an operating chamber having means therein against which the fluid acts to control a braking element of the vehicle, said system also having an accumulator chamber having associated therewith elastic means compressible by the inelastic fluid during the operation of the pressure-creating means and adapted to re-act to maintain the working pressure of said fluid when the pressure-creating means is inoperative, a valve for controlling the flow of said inelastic fluid to said operating chamber and means therein, and means controlled by the pressure applied in the operating chamber for closing said valve.

16. A control for power propelled vehicles comprising a pedal arm, an inelastic fluid circulating system under pressure including an operating chamber having a control-operating means therein for operating a braking element, and said system having an accumulator reservoir including a compression chamber, a pump for circulating inelastic fluid under pressure to said accumulator reservoir and compression chamber, a check valve interposed between said pump and said accumulator reservoir, means for controlling the maximum pressure in said accumulator reservoir, a valve operated by said pedal arm for controlling the flow of said inelastic fluid from said accumulator reservoir to said operating chamber and control-operating means therein, and means controlled as a result of pressure applied in said operating chamber for closing said valve.

17. A brake control for power propelled vehicles, comprising a pedal arm, an inelastic intermittent fluid circulating system under pressure, brake operating means in said system, a valve for controlling the flow of said circulating fluid under pressure to said brake operating means, and means for shifting said valve, said valve having balancing means for the fluid under pressure to be admitted to the brake operating means and additional means acted on by the admitted pressure to said brake operating means for closing said valve, the degree of movement or opening of said valve regulating the volume of flow of the fluid under pressure at the initial opening of the valve and the rate of travel of said brake operating means, and a fluid storage chamber including elastic means compressible by the fluid under pressure and adapted after compression to react to maintain pressure applying condition of said fluid under pressure, and pressure responsive means for limiting the maximum fluid pressure.

18. A brake control for power propelled vehicles, comprising a pedal arm, an inelastic intermittent fluid circulating system under pressure, brake operating means in said system, and a valve connected with said pedal arm for controlling the flow of liquid under pressure to said brake operating means, said valve having balancing means for the liquid under pressure to be admitted to the brake operating means, and additional means acted on by the admitted pressure to said brake operating means for closing said valve, the degree of movement or opening of said valve regulating the flow of the fluid under pressure at the initial opening of the valve and the rate of travel of said brake operating means, and a fluid storage chamber including elastic means compressible by the liquid under pressure and adapted after compression to react to maintain pressure applying condition of said liquid under pressure.

19. A brake control for power propelled vehicles, comprising an inelastic intermittent fluid circulating system under pressure, a valve for controlling the flow of fluid under pressure to said brake operating means, a cut-off cooperating with said valve and connected for simultaneous movement with said brake operating means, and means for shifting said valve, said valve having balancing means for the fluid under pressure to be admitted to the brake operating means, the degree of movement or opening of said valve regulating the volume of flow of the fluid under pressure at the initial opening of said valve and the rate of travel of said brake operating means and the movement of said cut-off, and a fluid storage chamber including elastic means compressible by the fluid under pressure and adapted after compression to react to maintain pressure applying condition of said fluid under pressure.

20. The combination, with a gas engine and its lubricating system having an inelastic fluid therein under pressure, means for creating pressure in the system, a brake element operating means in said system, a valve for controlling the flow of fluid to said brake element operating means, and means for shifting said valve, the degree of movement of said valve regulating the volume of flow of the fluid and the movement of the brake element operating means, said system also having an elastic means compressible by the inelastic fluid during operation of the pressure-creating means and adapted to maintain the working pressure of said fluid when the pressure-creating means is inoperative.

21. The combination, with a gas engine and its lubricating system having an inelastic fluid therein under pressure, means for creating pressure in the system, a brake operating means in said system, a valve for controlling the flow of fluid to said brake operating means, and means for shifting said valve, the degree of movement of said valve regulating the volume of flow of the fluid and the movement of the brake operating means, said system also having an elastic means compressible by the inelastic fluid during operating of the pressure-creating means and adapted to maintain the working pressure of said fluid when the pressure-creating means is inoperative.

22. The combination, with a gas engine and its lubricating system having an inelastic fluid therein under pressure, means for creating pressure in the system, a brake and clutch operating means in said system, a valve for controlling the flow of fluid to said brake and clutch operating means, and means for shifting said valve, the degree of movement of said valve regulating the volume of flow of the fluid and the movement of the brake and clutch operating means, said system also having an elastic means compressible by the inelastic fluid during operation of the pressure-creating means and adapted to maintain the working pressure of said fluid when the pressure-creating means is inoperative.

23. In combination with an automobile, an inelastic fluid pressure system, means operable by a part of the automobile for creating pressure in the system, said system including an operating chamber having means therein against which the fluid acts to control a braking structure, of the automobile, said system also having an accumulator chamber having associated therewith elastic means compressible by the inelastic fluid during operation of the pressure creating means, and adapted to re-act to maintain the working pressure of said fluid when the pressure-creating means is inoperative, and a valve adapted to control pressure flow of fluid to said operating chamber and means therein.

24. In combination with an automobile, an inelastic fluid pressure system, means operable by a part of the automobile for creating pressure in the system, said system including an operating chamber having means therein against which the fluid acts to control a braking structure, of the automobile, said system also having elastic means compressible by the inelastic fluid during operation of the pressure creating means, and adapted to re-act to maintain the working pressure of said fluid when the pressure-creating means is inoperative, a first and pedal-operable valve adapted to control pressure flow of fluid to said operating chamber and means therein after action of the fluid on said compressible elastic means, a second valve permitting pressure flow of fluid against said compressible elastic means but preventing back flow when the pressure-creating means is inoperative, and a third valve for limiting the amount of pressure applied against said compressible elastic means.

25. In combination with an automobile, an inelastic fluid pressure system, means operable by a part of the automobile for creating pressure in the system, said system including an operating chamber having means therein against which the fluid acts to control a braking structure, of the automobile, said system also having elastic means compressible by the inelastic fluid during operation of the pressure creating means and adapted to re-act to maintain the working pressure of said fluid when the pressure-creating means is inoperative, a first and pedal-operable valve adapted to control pressure flow of fluid to said operating chamber and means therein after action of the fluid on said compressible elastic means, a second valve between said compressible elastic means and said pressure creating means to prevent back flow when the pressure-creating means is inoperative and a third valve for limiting the amount of pressure applied against said compressible elastic means.

26. A control for power propelled vehicles comprising an inelastic fluid pressure system, and means for creating pressure therein, said system including an operating chamber having means therein against which the fluid acts to obtain control of a braking structure of the vehicle, said system also including a chamber providing an air cushion which is compressed by the inelastic fluid, and which is adapted to re-act to maintain pressure in the system when the pressure creating means is inoperative, a valve interposed between said air cushion and said operating chamber and means therein for controlling the pressure of the fluid to operate said means, a check valve interposed between said pressure-creating means and said air chamber for preventing back flow from said chamber, and a relief valve for controlling the maximum pressure in said chamber.

EDWIN G. STAUDE.